United States Patent [19]

Sellers

[11] 4,035,014

[45] July 12, 1977

[54] BULLET-RESISTANT RETRACTABLE SHIELD ASSEMBLY

[76] Inventor: Troy V. Sellers, 1749 N. Layman Ave., Indianapolis, Ind. 46218

[21] Appl. No.: 641,599

[22] Filed: Dec. 16, 1975

[51] Int. Cl.² .................................... B60R 27/00
[52] U.S. Cl. .................................... 296/24 R
[58] Field of Search ............... 296/24 R, 85; 70/90

[56] References Cited

U.S. PATENT DOCUMENTS

| | | | |
|---|---|---|---|
| 2,837,905 | 6/1958 | Wrougton | 70/90 |
| 2,865,670 | 12/1958 | Dunn | 296/24 R |
| 3,015,515 | 1/1962 | Halstead et al. | 296/24 R |
| 3,632,155 | 1/1972 | Parker | 296/24 R |

FOREIGN PATENT DOCUMENTS 1,580,577  3/1970  Germany .................. 296/24 R

Primary Examiner—Joseph F. Peters, Jr.
Assistant Examiner—John A. Pekar
Attorney, Agent, or Firm—Woodard, Weikart, Emhardt & Naughton

[57] ABSTRACT

An automobile passenger compartment partition employs a pair of sideplates fittable against door and window contours, secured to the body by brackets, and supporting a backplate extending between them. A vertically slidable window is received in rails on the sideplates and held up by key-operated plunger-type locks.

11 Claims, 8 Drawing Figures

BULLET-RESISTANT RETRACTABLE SHIELD ASSEMBLY

BACKGROUND OF THE INVENTION

1. Field of the Invention

This invention relates generally to dividers between front and rear seating compartments of automobiles, and more particularly to a bullet-resistant partition for police vehicles, for example.

2. Description of the Prior Art

Various arrangements have been used in the past for separating prisoners from policemen in vehicles. Some have been devised simply for privacy, and some have been devised specifically for taxicabs. U.S. patents disclosing such devices, some of which include rollbars, are as follows:

| Pat. No. | Inventor | Issue Date |
|---|---|---|
| 3,214,211 | Setina | Oct. 26, 1965 |
| 3,441,309 | Halstead | April 29, 1969 |
| 3,469,090 | Redus | Sept. 23, 1969 |
| 3,547,217 | Garza | Oct. 16, 1969 |
| 3,666,313 | Halstead | May 30, 1972 |
| Re.27,942 | Setina | March 19, 1974 |
| 12/23/75 641599 | 2 101 | 65.00CK |
| 12/23/75 641599 | 2 102 | 18.00CK |

The usual privacy-type partitions are found in limousines where the arrangements are built in by the factory. For the bullet-resistant type of partitioning, many have been devised for after-market installation in conventional vehicles. Some such arrangements are shown in the above-described patents.

There has remained a need for greater security, ease of installation, and ease of operation. The present invention is directed toward answering this need.

SUMMARY OF THE INVENTION

Described briefly, in a typical embodiment of the present invention, horizontally-spaced, generally upright templates are contoured to fit the compartment facing surfaces of the doors of the vehicle in which the unit is to be installed. These templates have window channels on the inner edges thereof, facing each other, and receive a vertically movable window therein. Means are provided to lock the window in the "up" position, such means preferably being plunger-type, key-operated locks.

DESCRIPTION OF THE PREFERRED EMBODIMENT

Figure 2:
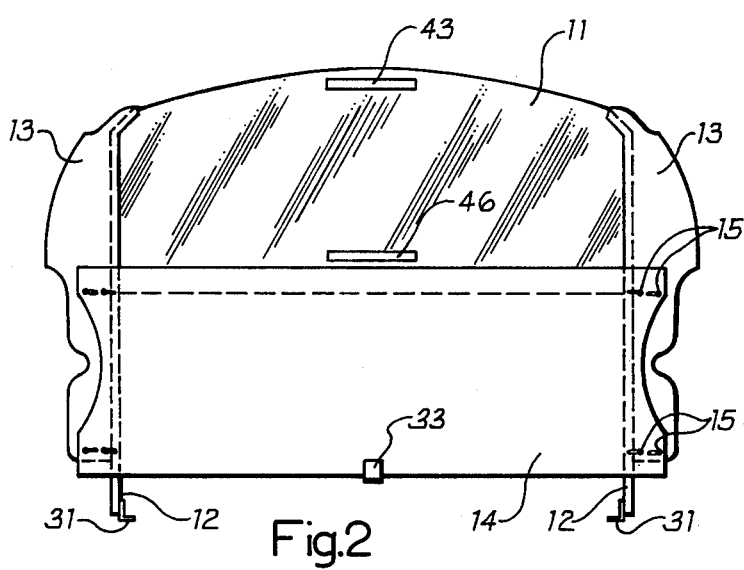
FIG. 2 is a rear elevational view thereof.

Referring now to the drawings in detail, the assembly includes a window made of a transparent plastic material which is bullet resistant. The material made by General Electric Company and marketed under the brand name "Lexan" in a thickness of ⅜ inch has been found suitable for the window 11. This window is received in a pair of channels 12 mounted to the front faces of a pair of side templates 13. The side templates and the channels are preferably made of high grade aluminum, the templates being ¼ inch thick. The channels are welded to the templates. As is shown in FIG. 2, a backplate 14 is fastened directly to the back of the side templates and it may also be made of aluminum, typically 3/16 inch thick. It is fastened to the side templates by eight screws, each being received through a horizontally extending slot in the backplate and a vertical slot in the side template, to thereby accommodate different heights and widths of vehicle interiors, and each having a locknut on the front side of the template to prevent removal of the screw from the back side.

Figure 3:
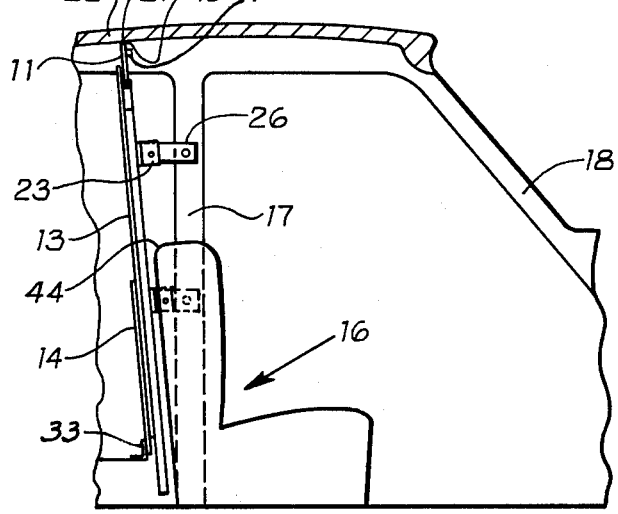
FIG. 3 is a side elevational thereof installed in a passenger car body, the latter being shown fragmentarily.
Figure 5:
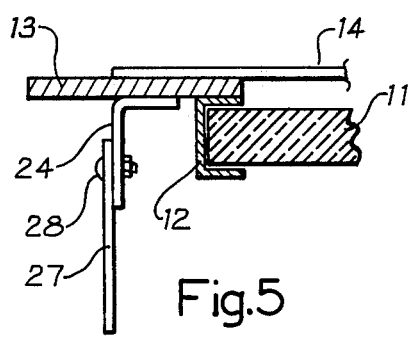
FIG. 5 is a section through a portion of the side template and channel, the section being taken at line 5—5 in FIG. 1 and viewed in the direction of the arrows.

As shown in FIG. 3, the side template 13 is mounted in the vehicle body at a slight incline practically paralleling the back surface of the front seat 16. It is secured in this position by brackets bolted to the center pillar or "B" post 17 of the automobile body, the "A" post being shown at 18. With the window 11 fully raised, it contacts the headlining material 19 in the passenger compartment entirely across as is better shown in FIG. 4 at 21. The car roof 22 is immediately above the headlining in conventional construction, although occasionally some insulating padding is provided between the headlining and roof in conventional passenger car construction.

Figure 6:
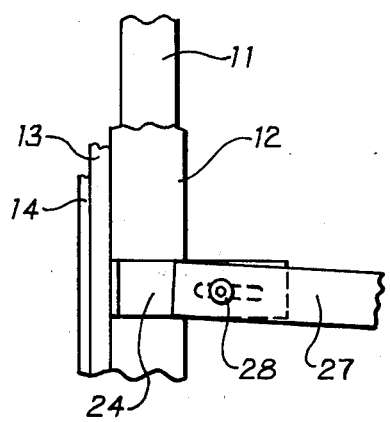
FIG. 6 is an enlarged fragmentary elevation of a portion of the unit from the same aspect as viewed in FIG. 3.

To describe the attachment of the assembly in more detail, reference is again made to FIGS. 3, 4, and 6. The templates 13 are secured to the "B" post by two angle brackets 23 and 24 at about mid-window level amd mid-seatback level. These brackets may be identical. Straight brackets 26 and 27 are secured to the angle brackets by means such as screws 28 received in slots in the angle bracket, permitting appropriate establishment of the angle of the channels parallel to the back of the front seat. The lower ends of the channels are secured to the floor of the passenger compartment by slotted angle brackets 31 affixed to the lower end of the channels and affixed to the floor by bolts received up through the floor pan of the car and through the floor mat 32 in the passenger compartment immediately behind the front seat. An additional slotted angle bracket 33 is provided at the center of the backplate 14 and fastened to the floor at the tunnel 34. The provision of the slots in the sideplates, the backplate, and the brackets, facilitates installation of the assembly in various sizes of vehicle interiors.

Figure 4:
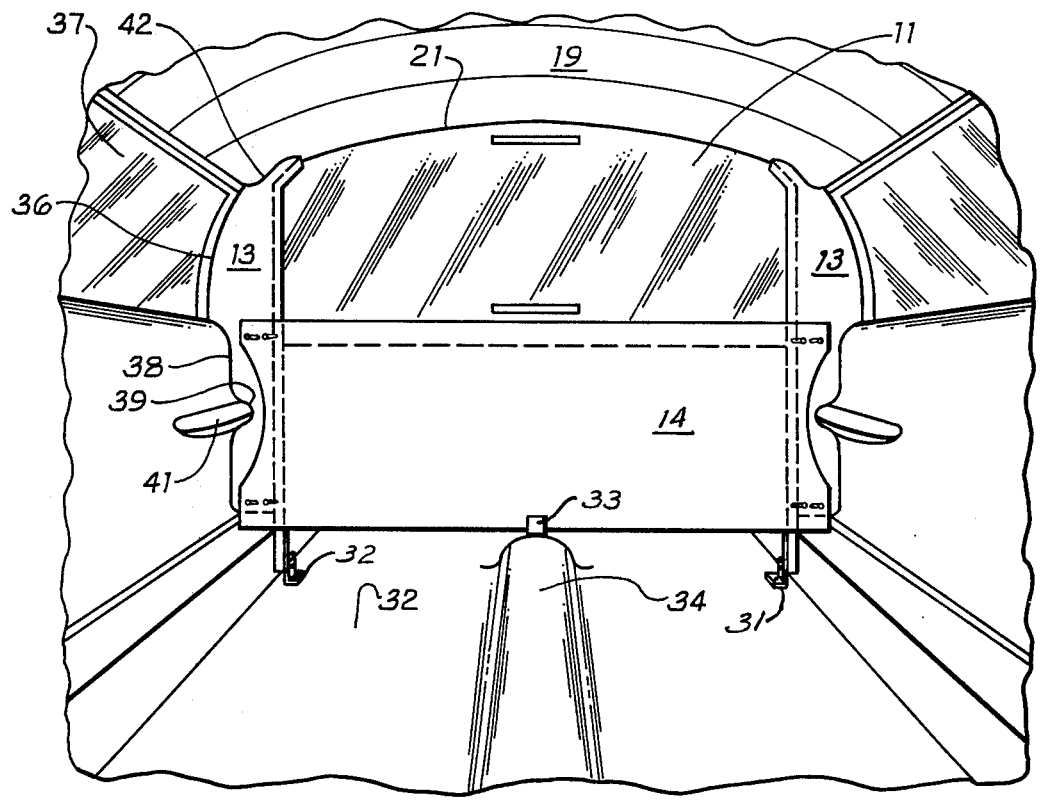
FIG. 4 is a rear perspective view of the interior of the car as seen from the back seat looking forward.

It is a feature of the invention that the side templates are provided with outer edges contoured to precisely fit the surface features of the passenger compartment defining faces of the rear doors. This is best shown in FIG. 4 where the side template 13 has an upper side edge 36 contoured to precisely fit the contour of the curved window 37 in the door, an intermediate side edge 38 contoured to fit the inner face of the door upholstery itself, including the armrest notch 39 for the armrest 41, and a top portion 42 contoured to fit the headlining material and above-door molding, if any, of the car body. This, together with the contour of the upper edge of the window 11, fitting the contour of the headlining material, precludes passage of any objects from the rear compartment to the front compartment, providing complete security.

When there are no rear seat occupants in the car, the window can be lowered. Suitable stops are provided on the backplate to provide the lower limit of travel of the window, which is typically such that the handle 43 affixed to the front of the window will be immediately above the top 44 of the back of the front seat. In this way, it can be raised by grasping it from the location of the front seat and pulling upward on it. The additional handle 46 affixed to the front of the window facilitates holding it up in place as the window locks are actuated.

Figure 1:
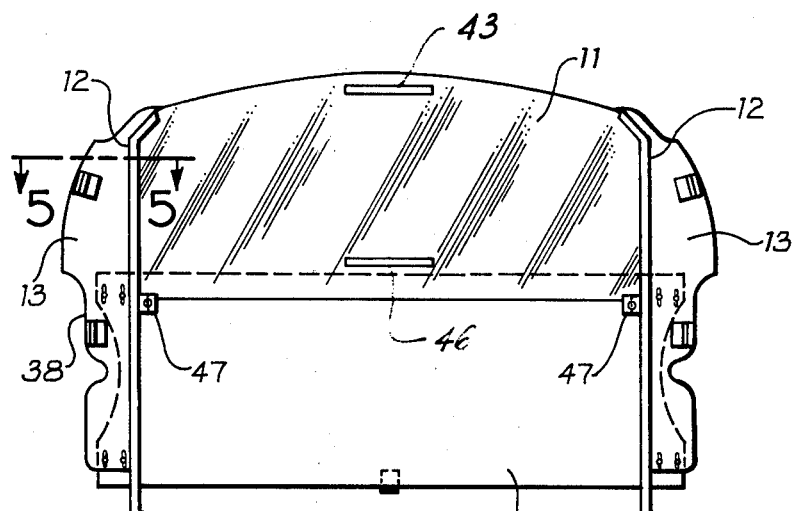
FIG. 1 is a front elevational view of the shield assembly.
Figure 8:
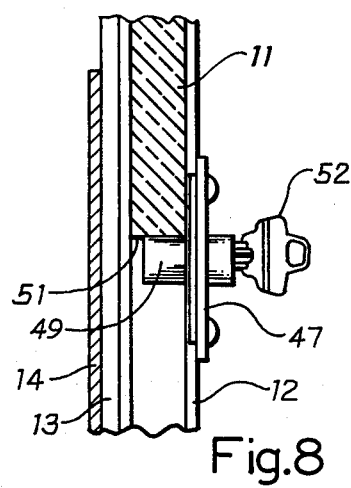
FIG. 8 is an enlarged fragmentary section showing a lock assembly holding the window up.
Figure 7:
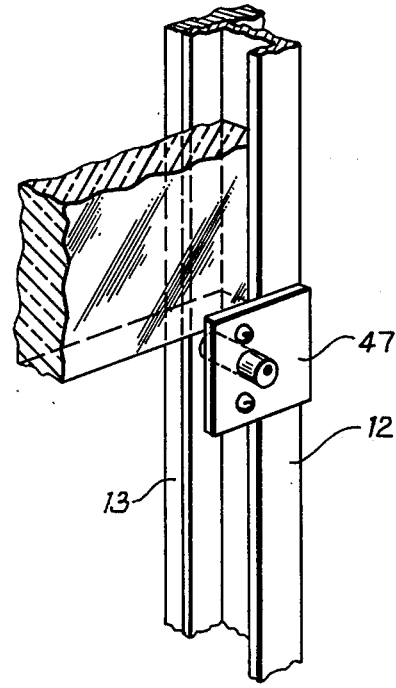
FIG. 7 is an enlarged fragmentary perspective view of the front of the lock assembly at one side of the window.

To understand the operation of the window locks, it will be helpful to refer to FIGS. 1, 7, and 8. In these figures, lock mounting brackets 47 are affixed to the front faces of channels 12. The plunger lock is mounted in the bracket. Such locks are made by the Eagle Lock Company of Chicago, Ill. FIG. 8 shows the plunger 49 in position under the lower edge of the window 11. The key 52 may thereupon be removed to lock the plunger in the window holding and locking position shown in the various figures, where its upper edge at 21 is in contact with the headlining material 19.

From the foregoing description, it can be recognized that the nature of the structure and arrangement of parts according to the present invention facilitates variations as needed for adaption to vehicles having different interior contours. The basic arrangement can be employed with the only change being in the outside edge contours of the side templates, and, in a few instances, possible slight change in the top contour of the window. In this way, maximum security can be provided at a comparatively nominal initial purchase cost and installation cost for the conventional passenger automobile adapted to police use. The assembly is rustproof, rattle free and virtually maintenance free. The window locks are key operable, and from the front seat only.

While there have been described above the principles of this invention in connection with specific apparatus, it is to be clearly understood that this description is made only by way of example and not as a limitation in the scope of the invention.

What is claimed is:

1. A bullet-resistant shield assembly for partitioning the passenger compartment of a motor vehicle and comprising:
   horizontally-spaced, generally upright side templates contoured to fit the compartment facing surfaces of vehicle doors rearwardly of a vehicle seat back;
   window channel means on said templates and facing each other;
   a window guidingly received in said channel means;
   a backplate secured to said templates behind said channel means,
   said window being movable in and guided by said channel means to an upper position in which it closes the area between the upper portion of the seat back and the ceiling of the passenger compartment and downwardly to a storage position, and
   window lock means secured to said channel means and operable from in front of said window to hold the window in its upper position;
   said backplate extending horizontally from one of said side templates to the other of said templates, and extending vertically downward from a line above the location of the bottom of the window when the window is up, to a line adjacent the lowermost points on the side templates.

2. The assembly of claim 1 wherein said window lock means include:
   a pair of brackets, one bracket being secured to each of said templates;
   a pair of locks, each lock being mounted in one of said brackets and each lock having a plunger movable rearwardly into position under said window to hold the window up.

3. The assembly of claim 2 wherein:
   each lock has a key operable to lock the plunger in the rearward, window-supporting position, the key being thereupon removable from the lock.

4. The assembly of claim 1 wherein:
   the outer edge of each template has an upper, window contour matching contoured portion an a lower, door surface contour matching contoured portion.

5. The assembly of claim 4 wherein:
   the lower portion has an armrest receiving notch therein.

6. The assembly of claim 1 wherein:
   said window is bullet-resistant, transparent plastic about ⅝ inches thick, unframed at the sides and top and directly received and sliding in said channel means,
   said backplate is bullet-resistant aluminum about 3/16 inch thick, and
   said templates are bullet-resistant aluminum about ¼ inch thick.

7. The assembly of claim 6 wherein:
   said templates and backplate are solid substantially imperforate sheet material.

8. In a passenger-carrying vehicle having a passenger compartment with front and back seats, and a front door for access to the front seat and a back door for access to the back seat, partitioning apparatus for the passenger compartment comprising:
   horizontally-spaced side templates having outer edges snugly fitting the contours of the passenger compartment defining side walls of the vehicle immediately behind said front seat,
   window guide means on said templates ,
   a window having an upper position in which an upper edge thereof snugly engages the passenger compartment defining ceiling of the vehicle immmediately behind said front seat, said window being movable downwardly in said guide means,
   said templates being secured to said vehicle independently of said front seat,
   window lock means secured to said guide means and operable from the said front seat to lock said window in its upper position,
   said lock means including a pair of locks, each lock including a plunger movable rearwardly into position under said window to hold the window in its upper position; and each lock having a removable key operable to lock the plunger in the rearward, windowsupporting position.

9. The apparatus of claim 8 wherein:
   said templates and window are entirely behind the said front seat.

10. The apparatus of claim 8 wherein:

said templates are secured to the vehicle by brackets affixed to a post between said front and back doors.

11. The apparatus of claim 8 wherein:
said window is bullet-resistant transparent plastic,
said templates are bullet-resistant aluminum plates,
and a bullet-resistant aluminum backplate is fastened to said templates behind said window and extends across behind the front seat and shields the front seat from the back seat.

* * * * *